Nov. 2, 1965  W. E. HAPPEL  3,215,285
TRANSFER APPARATUS FOR MULTIPLE MACHINES
Filed Feb. 15, 1963  5 Sheets-Sheet 1

INVENTOR
WILLIAM E. HAPPEL
BY
ATTORNEY

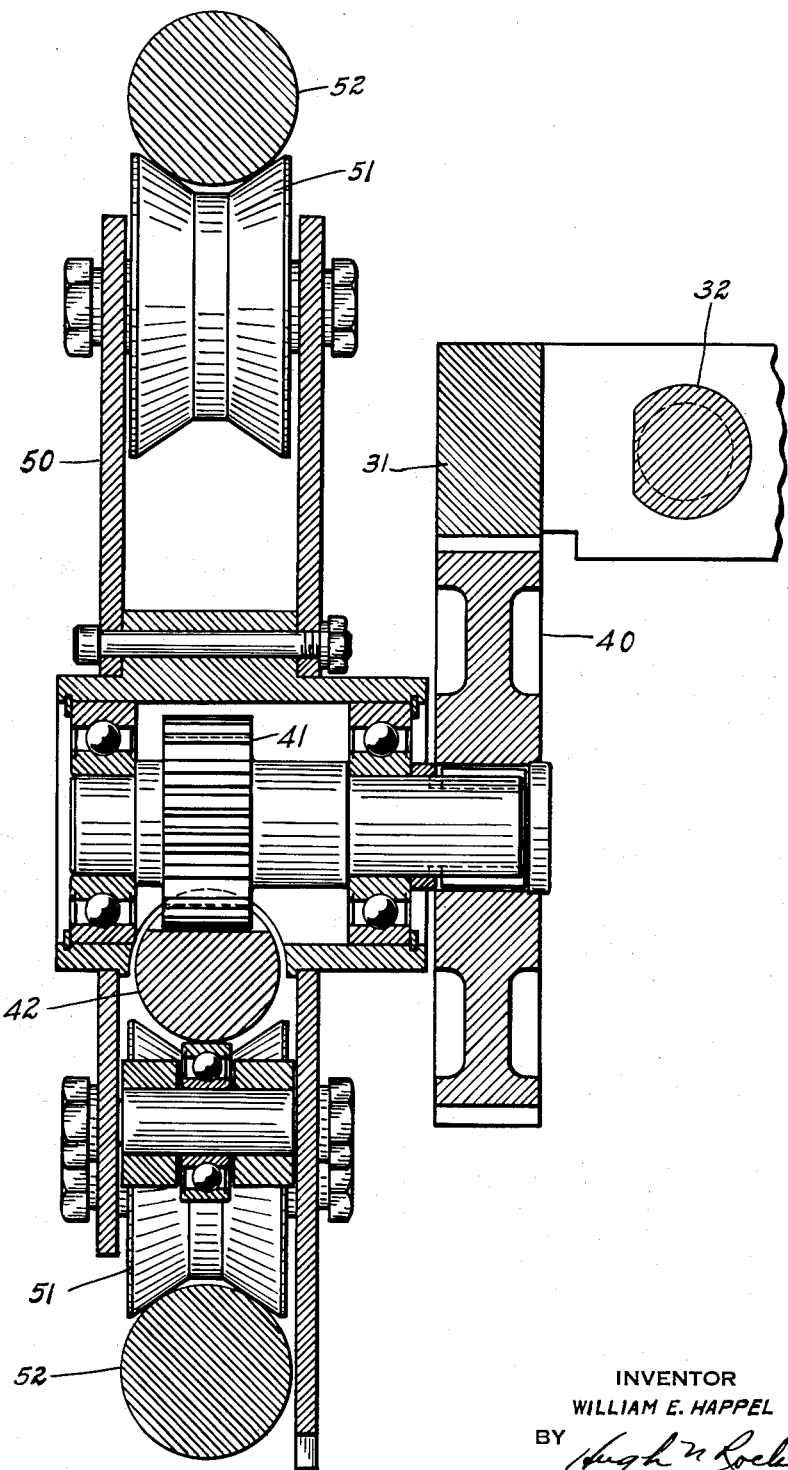

United States Patent Office 3,215,285
Patented Nov. 2, 1965

3,215,285
TRANSFER APPARATUS FOR MULTIPLE MACHINES
William E. Happel, Waynesboro, Pa., assignor to Landis Tool Company, Waynesboro, Pa.
Filed Feb. 15, 1963, Ser. No. 258,766
10 Claims. (Cl. 214—1)

This invention relates to transfer apparatus for machine tools, particularly crank grinding machines.

Previous transfer apparatus was arranged to load and unload workpieces for a single machine. Where two machines are arranged side by side, it is desirable to provide a single transfer apparatus for both machines.

It is, therefore, an object of the present invention to extend the range of a single machine transfer apparatus to accommodate two machines.

Another object is to use all the essential structural elements of a single machine transfer apparatus.

Another object is to provide means whereby the traverse mechanism, which has a range limited to serving a single machine, may be extended to serve a second machine.

Another object is to provide means to reset the traverse mechanism after it has served one machine to move through a full stroke in the same direction to serve the second machine.

Another object is to provide means whereby each machine provides a signal which causes the transfer apparatus to serve that particular machine.

Another object is to provide means whereby the transfer apparatus serves each machine in the order in which it receives a signal.

Another object is to provide means whereby a single carriage having two pairs of crank transfer hooks, can be used to serve two machines.

The term "serve" as used in the specification relates to the overall function of the carriage and the loading and unloading devices.

FIG. 5 is a section on the line 5—5 of FIG. 3.

Figure 1:
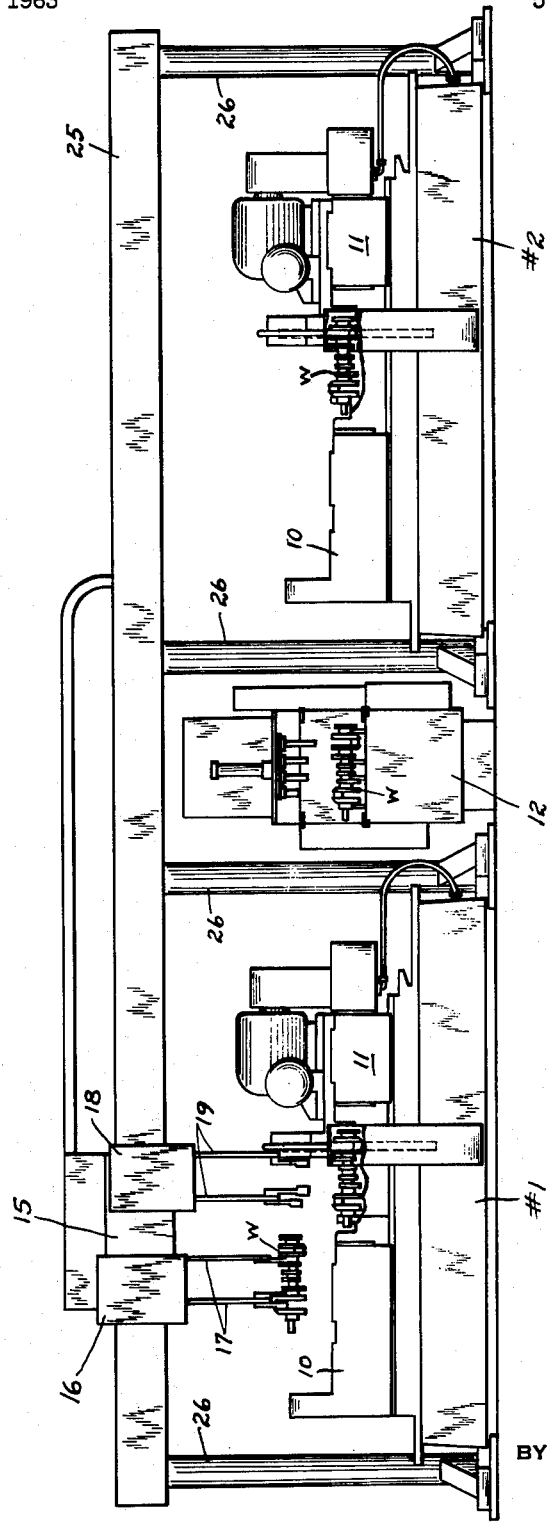
FIG. 1 is a front elevation of two crank grinding machines with a single transfer carriage for serving both machines.
Figure 2:
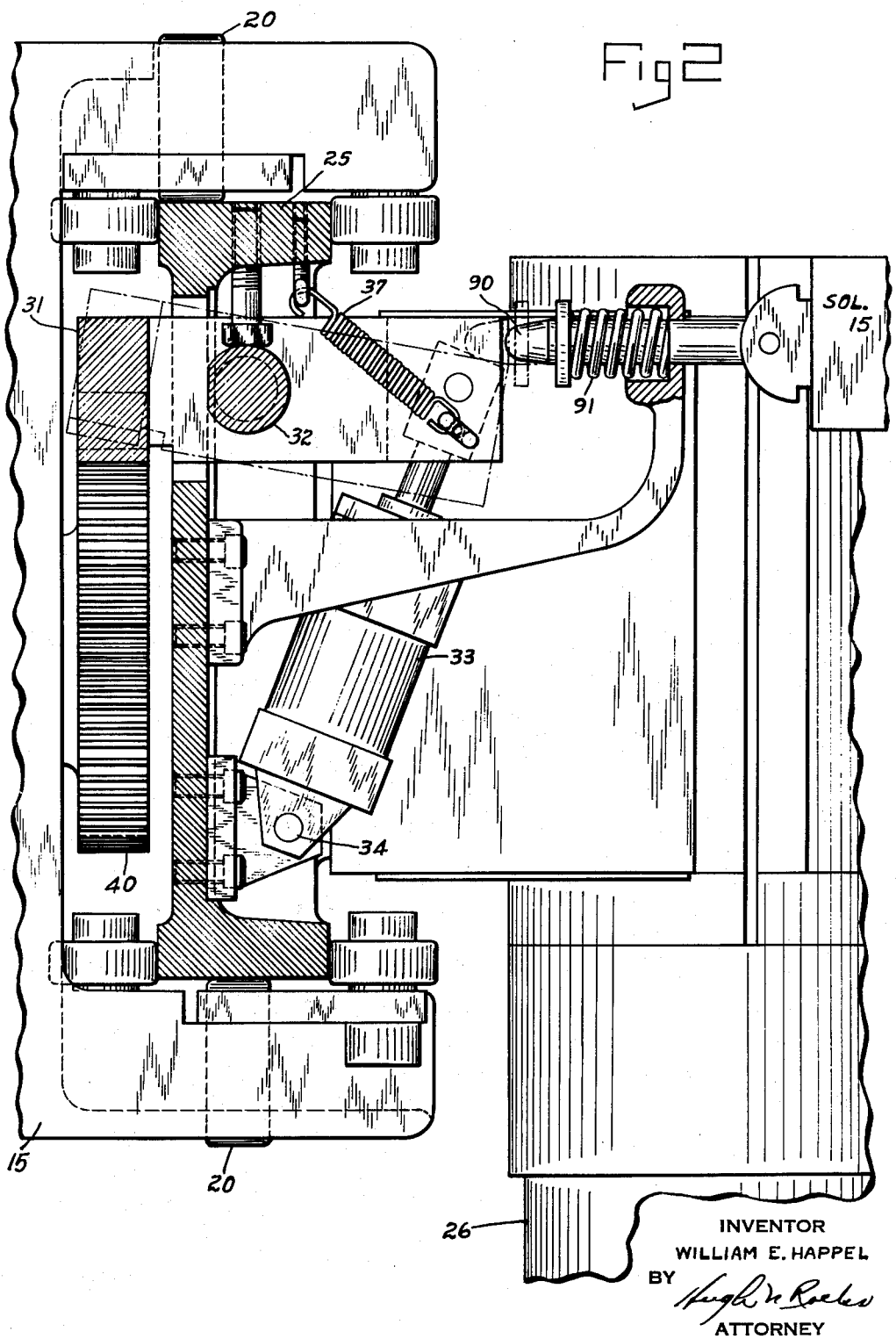
FIG. 2 is a partial end view, partly in section, of the means for moving a section of the stationary rack out of engagement with the pinion of the traverse mechanism.
Figure 3:
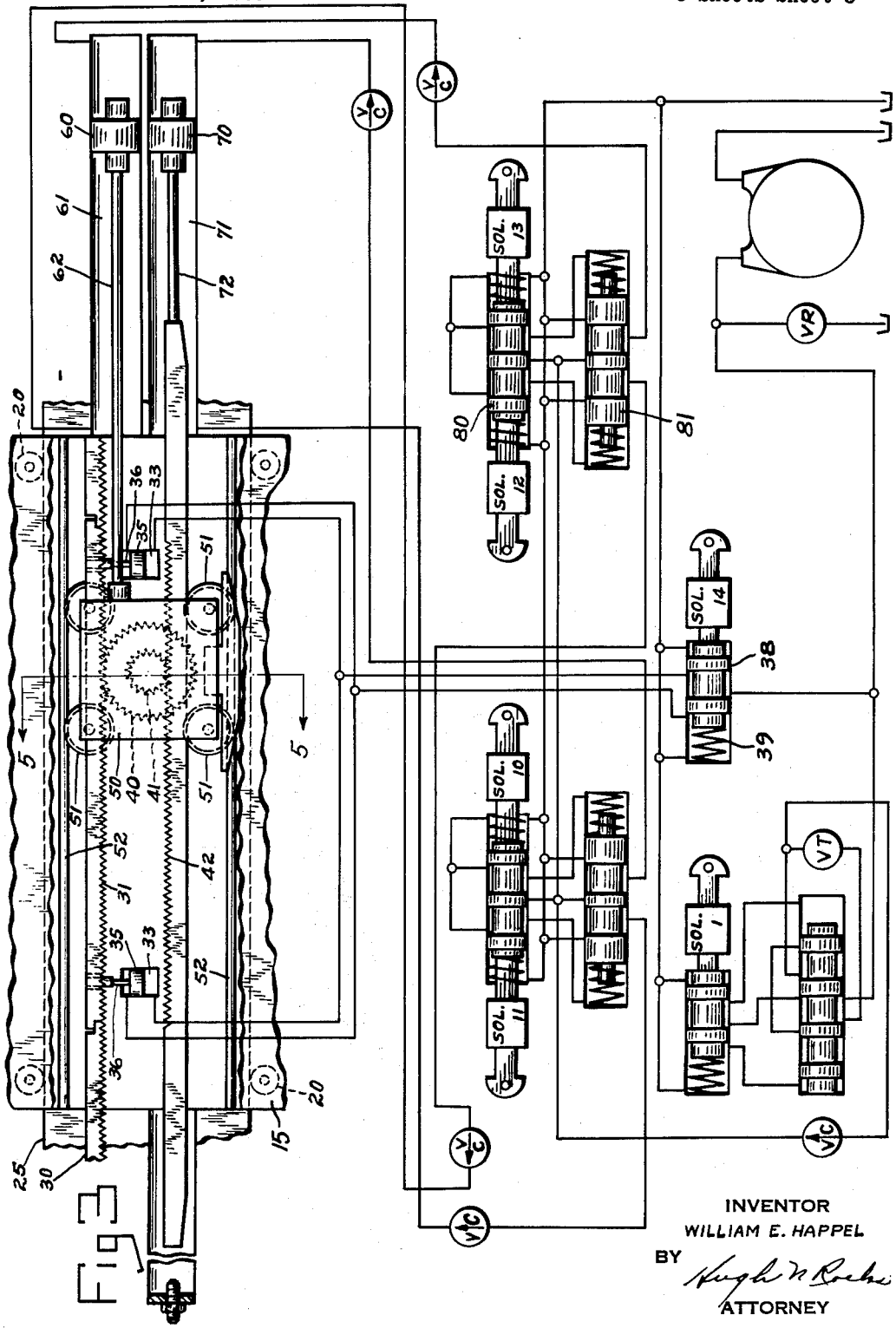
FIG. 3 is an hydraulic circuit.
Figure 4:
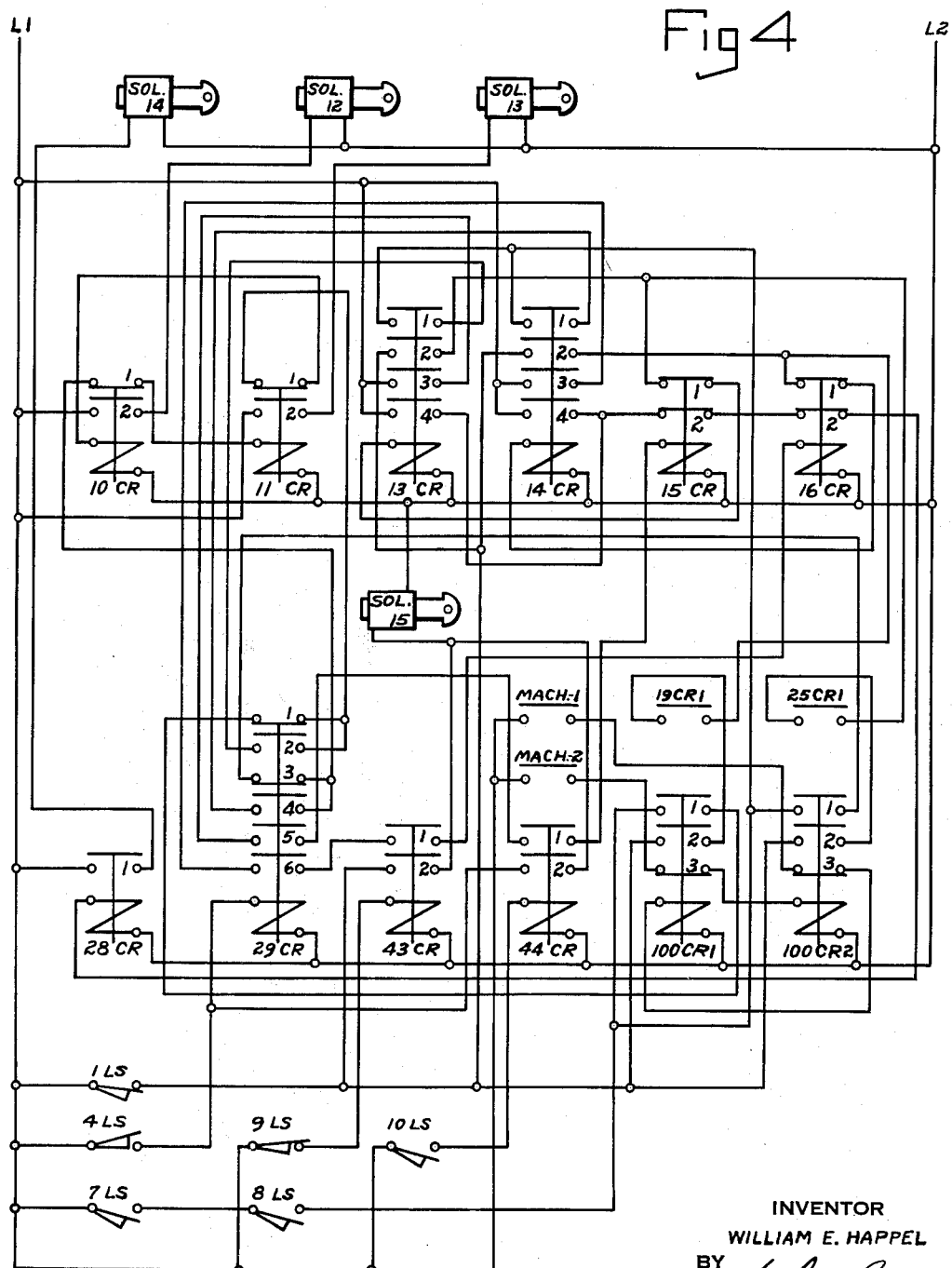
FIG. 4 is an electrical circuit.

Two crank grinders, #1 and #2, of the type disclosed in U.S. Patent 3,118,258, granted January 21, 1964, are arranged side by side. Conveyor 12 is mounted between the #1 and #2 machines and serves to supply unground workpieces for both machines and to receive ground workpieces from both machines. In each machine, workpiece W is rotatably supported between crankheads 10 and 11.

A single carriage 15 has mounted thereon, a loading unit 16 having a pair of work handling hooks 17. Carriage 15 also has an unloading unit 18 having a pair of work handling hooks 19. Carriage 15 is supported on rollers 20 on a horizontal track member 25 which is supported on vertical columns 26.

The means for actuating hooks 17 and 19 to pick up and deposit crankshafts either in the machines or on the conveyor 12 including the means for traversing carriage 15 between said machines and conveyor 12, is substantially the same as that disclosed in U.S. Patent 3,124,257, granted March 10, 1964.

Aside from the fact that horizontal track 25 has a rack 30 of corresponding length attached thereto, this apparatus differs from that in said U.S. Patent 3,124,257, by a removable intermediate section 31 in rack 30 pivotally mounted on track 25 at 32 for movement into and out of engagement with pinion 40 of the traverse mechanism.

The means for moving rack section 31 consists of a pair of cylinders 33, one end of which is pivotally attached to track member 25 at 34. Pistons 35 in cylinders 33 are connected through piston rods 36 to rack section 31. Spring 37 having one end attached to rack 30 and the other end to track 25, urges rack section 31 into engagement with pinion 40.

The traverse mechanism consists of a trolley 50 which is movably mounted on rollers 51 on track 52 in carriage 15, and has rotatably mounted therein, a large pinion 40 and a small pinion 41 in axially spaced relation on the same shaft. Pinion 40 is supported in operative relation to rack 30. Pinion 41 is in operative engagement with rack 42 which is slidably mounted in carriage 15.

The means for moving trolley 50 consists of a piston 60 in cylinder 61 which is mounted on carriage 15. Piston 60 is attached to trolley 50 by means of piston rod 62. When piston 60 moves to the left with trolley 50, pinion 41 in engagement with rack 42 is caused to rotate in a counter-clockwise direction. Pinion 40 rotating in the same direction in engagement with rack 30, causes carriage 15 to move to the right. Rack 30 and rack section 31 are mounted on track 25 and are, therefore, longitudinally stationary. Carriage 15 is supported by rollers 20 for movement on track 25. Trolley 50 is supported by rollers 51 for movement on track 52 on carriage 15. Pinions 40 and 41 are rotatably mounted in trolley 50, with pinion 40 engaging rack 30 and rack section 31, and pinion 41 engaging rack 42 which is slidably mounted in carriage 15. For the purpose of this portion of the description, rack 42 may be considered as being longitudinally stationary in carriage 15.

Cylinders 61 and 71 which contain pistons 60 and 70 respectively for effecting longitudinal movement of trolley 50 and rack 42 respectively, are both attached to carriage 15. Thus, everything necessary to move carriage 15 is mounted on and movable with said carriage with the exception of rack 30 and rack section 31. When piston 60 moves trolley 50 to the left on carriage 15, pinions 40 and 41 are rotated in a counter-clockwise direction because of the engagement of pinion 41 with rack 42. The corresponding movement of pinion 40 in engagement with rack 30 and rack section 31 causes carriage 15 along with trolley 50 and cylinders 61 and 71, to move to the right. The difference in diameter between pinions 40 and 41 causes the movement of piston 60 and trolley 50 to be amplified in the movement of carriage 15 in a suitable ratio generally around 3 or 4 to 1.

Another function of rack 42 is to shift carriage 15 through a short distance to position hooks 17 or 19 in operative relation to either machine or to conveyor 12, as shown in U.S. Patent 2,867,058, granted January 6, 1959 and said U.S. Patent 3,124,257.

The means for shifting rack 42 consists of a piston 70 in cylinder 71 which is attached to carriage 15. Piston 70 is attached to rack 42 by means of piston rod 72.

Operation

With carriage 15 over conveyor 12, having returned leftward from servicing the #2 machine and ready with an unground workpiece to load hooks 17, the #1 machine demand signal contact 1 closes to complete a circuit through normally closed relay contact 100CR2-2 to energize relay 100CR1. Trolley 50 will be at the right hand end of carriage 15.

Loader demand relay 100CR1 is energized when the #1 machine has completed a grinding operation.

Relay 100CR2 bears the same relation to the #2 machine.

Relay contact 100CR1-1 completes a circuit from rack safety limit switch 1LS, which is closed when unload hooks 19 are over conveyor 12, through relay contact 19CR1 and normally closed relay contact 16CR1, to energize loader reset relay 14CR.

Relay contact 14CR4 completes a circuit through normally closed relay contacts 15CR2 and 16CR2 to energize rack lift relay 28CR.

Relay contact 28CR1 energizes solenoid 14 to shift valve 38 against spring 39. Valve 38 directs fluid to the upper ends of cylinders 33 to tilt rack section 31 out of engagement with the traverse mechanism.

As soon as rack section 31 is lifted, plunger 90 is advanced by spring 91 to hold rack section 31 in dis-engaged position. When the reset movement is completed, traverse limit switches 9LS or 10LS will energize solenoid 15 and retract plunger 90.

Rack-up limit switch 4LS closes to energize relay 29CR.

Relay contact 14CR1 closes to complete a circuit through relay contact 29CR4 and normally closed relay contact 10CR1, to energize traverse right relay 11CR and solenoid 13.

With rack section 31 separated from pinion 40, traverse piston 60 may shift trolley 50 in either direction without moving carriage 15. Thus piston 60 and trolley 50 may be reset to the right or to the left depending on the previous position of these parts, so that upon re-engagement of rack section 31 with pinion 40, movement of carriage 15 may be extended to move into position to serve the other machine.

As described above, limit switch 4LS is closed by the tilting of rack section 31, energizing solenoid 13 and shifting valve 80 to the left to direct fluid to the right hand end of traverse cylinder 61 to shift piston 60 to the left and trolley 50 to the left end of carriage 15.

Carriage 15 remains over the conveyor during the reset movement because pinion 40 is not in engagement with rack section 31. After rack section 31 is returned to engagement with pinion 40, piston 60 may be moved to the right. Pinion 41 will be rotated in a clockwise direction by its engagement with rack 42. Pinion 40 also turning in a clockwise direction in engagement with rack section 31 and rack 30, will cause trolley 50 with carriage 15, to move to the left to the #1 machine.

At the end of the reset movement of piston 60 to the left, traverse right limit switch 9LS closes to energize relay 43CR.

Relay contact 43CR1 closes to complete a circuit through relay contact 14CR3 and relay contact 29CR6 to energize relay 16CR.

Normally closed relay contact 16CR1 opens to de-energize relay 14CR.

Relay contact 14CR1 opens to deenergize traverse right relay 11CR and solenoid 13 to stop the reset movement of piston 60 and trolley 50 to the left.

Relay contact 14CR2 is a holding contact.

Normally closed relay contact 16CR2 opens to de-energize rack lift relay 28CR and solenoid 14.

Rack section 31 is returned to engagement with pinion 40.

It is important that rack section 31 engage the proper tooth of pinion 40 when it re-engages said pinion after a reset movement. Otherwise, subsequent movement of carriage 15 might stop with hooks 17 or 19 out of proper longitudinal position to engage the workpiece W. Such a situation may arise if it should become necessary to make an emergency stop of the cycle with carriage 15 in an intermediate position relative to rack section 31, in which case, all solenoids would become deenergized. In the case of rack section 31, solenoid valve 38 which controls the raising and lowering of rack section 31, would shift to position to permit rack section 31 to move back into alignment with rack 30 while trolley 50 and pinion 40 are in intermediate position instead of at the end of the reset movement. The cycle cannot be resumed with these parts out of position.

In order to prevent the dropping of rack section 31 under such circumstances, latch plunger 90 actuated by spring 91 in one direction and solenoid 15 in the opposite direction, are mounted so that when rack section 31 is in engagement with pinion 40, plunger 90 is held against rack section 31 by spring 91.

When rack section 31 is tilted out of engagement with pinion 40, latch plunger 90 is advanced by spring 91 to prevent the return of rack section 31 until the reset movement is resumed and one or the other of the traverse limit switches 9LS or 10LS is actuated.

Limit switches 9LS and 10LS, when closed, energize relays 43CR and 44CR respectively. Each of said relays has a contact 43CR2 and 44CR2 in parallel circuits connected to solenoid 15 so that even though power is cut off accidentally or otherwise, plunger 90 will hold section 31 in inoperative position until the reset movement is completed and limit switches 9LS and 10LS are closed to energize solenoid 15 and retract plunger 90 upon restoration of power, but only at the end of the reset movement.

Rack limit switch 4LS is opened, deenergizing relay 29CR.

Normally closed relay contact 29CR1 completes a circuit from relay contact 100CR1-2 and normally closed relay contact 11CR1 to energize traverse left relay 10CR.

Normally closed relay contact 10CR1 in the circuit to relay 11CR opens to keep traverse right relay 11CR de-energized.

Relay contact 10CR2 closes to energize traverse left solenoid 12, shifting reversing pilot valve 80 to the right and directing fluid to the left hand end of reversing valve 81 which, in turn, directs fluid under pressure to the left end of traverse cylinder 61, causing piston 60 to move to the right and through the traverse rack and pinion to move carriage 15 to the left to the #1 machine.

At the end of the movement of carriage 15 to the left, unload hooks 19 remove a ground workpiece from the #1 machine.

Load hooks 17 place an unground workpiece in the #1 machine.

When load hooks 17 return after releasing a workpiece, limit switch 7LS with previously closed limit switch 8LS closes a circuit to energize traverse right relay 11CR.

Relay contact 11CR2 energizes traverse right solenoid 13 which shifts valve 80 and reversing valve 81 to direct fluid under pressure to the right hand end of cylinder 61, shifting piston 60 to the left and carriage 15 to the right.

At the end of the traverse movement of carriage 15 to the right, load hooks 17 are in position to remove an unground workpiece from conveyor 12.

Carriage 15 shifts left to place hooks 19 in position to deposit a ground workpiece on conveyor 12.

Hooks 19 then return to up position, closing limit switch 8LS to await a signal from the #2 machine or to answer a previous signal from the #2 machine.

When the #2 machine signals, a circuit is closed through normally closed relay contact 100CR1-3 to energize relay 100CR2.

Relay contact 100CR2-3 closes to complete a circuit through relay contact 25CR1 and normally closed relay contact 15CR1 to energize reset relay 13CR.

Relay 13CR is held by relay contact 13CR2.

Relay contact 13CR4 closes to complete a circuit to energize rack lift relay 28CR and rack lift solenoid 14 to remove rack section 31 out of contact with pinion 40.

Rack up limit switch 4LS closes to energize relay 29CR.

Relay contact 29CR2 closes in the circuit with previously closed relay contact 13CR1 and normally closed relay contact 11CR1 to energize traverse left relay 10CR and traverse left solenoid 12.

Solenoid 12 shifts pilot valve 80 to the right to direct fluid under pressure to the left hand end of cylinder 61 to shift piston 60, the rack and pinion mechanism, and trolley 50 to the right while pinion 40 is out of engagement with rack section 31 to reset the traverse mechanism for further movement to the right from conveyor 12 to the #2 machine.

At the end of the reset movement, traverse left limit switch 10LS closes to energize relay 44CR.

Relay contact 44CR1 closes a circuit from relay contacts 13CR3 and 29CR5 to energize relay 15CR.

Normally closed relay contact 15CR2 opens to deenergize rack lift relay 28CR and rack section 31 returns to engagement with pinion 40.

Limit switch 4LS is opened and relay 29CR is deenergized.

Normally closed relay contact 29CR3 closes through previously closed relay contact 100CR2-1, and normally closed relay contact 10CR1 energizes traverse right relay 11CR.

Relay contact 11CR2 is again closed to energize solenoid 13 to traverse carriage 15 to the #2 machine.

When the #2 machine has received an unground workpiece after removal of the ground workpiece by hooks 19, load hooks 17 return to swing-up position, closing limit switch 7LS to complete a circuit through previously closed limit switch 8LS, normally closed relay contacts 29CR1 and 11CR1, to energize traverse left relay 10CR and solenoid 12 which directs fluid under pressure to the left hand end of cylinder 61, shifting piston 60 to the right and carriage 15 to the left in the direction of conveyor 12.

I claim:

1. In a multiple machine tool combination, a work loading device for alternately serving more than one machine comprising a horizontal track member, a conveyor positioned between two machines for supplying workpieces to both machines, a carriage on said horizontal track, a motor for moving said carriage on said track, said carriage having a loading device and an unloading device, signal means on each machine for actuating said carriage to operative relation with one or the other of said machines, and control means operable in response to one or the other of said signal means for actuating said carriage in either direction to place said loading and unloading devices in operative relation with the machine which gives the signal.

2. In a multiple machine tool combination, a work loading device for serving two machines comprising a conveyor between said machines for supplying unground workpieces and removing ground workpieces for both machines, a horizontal track, a carriage on said track, a motor for moving said carriage on said track between said conveyor and one or the other of said machines, said motor having a range of movement to move said carriage approximately half the length of said track, a loading device and an unloading device on said carriage, each of said machines having control means operable when a machine is ready to be served for actuating said motor to move said carriage in the direction of the machine to be served.

3. A work handling device for loading and unloading a pair of independently operable machine tools comprising a horizontal track extending in operative relation to both of said machines, a carriage on said track, a loading device and an unloading device on said carriage, a motor for moving said carriage on said track, said motor having a range of movement to traverse said carriage approximately half the length of said track, a rack corresponding in length to said track, and having a retractable intermediate portion whereby to disconnect said motor and said rack when said carriage is in an intermediate position on said track after returning from servicing one machine and in response to a demand from the other machine, and control means operable when said motor and said rack are disconnected to reset said motor in preparation for continuing the movement of said carriage in the same direction to service said other machine.

4. A work handling device for loading and unloading a pair of independently operable machine tools comprising a horizontal track extending in operative relation to both of said machines, a carriage on said track, a loading device and an unloading device on said carriage, a motor for moving said carriage on said track, said motor having a range of movement to traverse said carriage approximately half the length of said track, a rack corresponding in length to said track, means to disconnect said motor and said rack when said carriage is in an intermediate position on said track after returning from servicing one machine and in response to a demand from the other machine, and control means operable when said motor and said rack are disconnected to reset said motor in preparation for continuing the movement of said carriage in the same direction to service said other machine.

5. A work handling device for loading and unloading a pair of independently operable machine tools comprising a conveyor between said machines for supplying unground workpieces and removing ground workpieces for both machines, a horizontal track extending in operative relation to both of said machines, a carriage on said track, a loading device and an unloading device on said carriage, a motor for moving said carriage on said track, between said conveyor and one or the other of said machines, said motor having a range of movement to traverse said carriage between said conveyor and one of said machines, a rack corresponding in length to said track, and having a retractable intermediate portion whereby to disconnect said motor and said rack when said carriage is in operative relation with said conveyor after returning from servicing one machine, and control means responsive to retraction of said rack portion to reset said motor in preparation for continuing the movement of said carriage in the same direction to service said other machine.

6. A work handling device for loading and unloading a pair of independently operable machine tools comprising a conveyor between said machines for supplying unground workpieces and removing ground workpieces for both machines, a horizontal track extending in operative relation to both of said machines, a carriage on said track, a loading device and an unloading device on said carriage, a motor for moving said carriage on said track, between said conveyor and one or the other of said machines, said motor having a range of movement to traverse said carriage between said conveyor and one of said machines, a rack corresponding in length to said track, means to disconnect said motor and said rack when said carriage is in operative relation with said conveyor after returning from servicing one machine, and control means operable when said motor and said rack are separated to reset said motor in preparation for continuing the movement of said carriage in the same direction to service said other machine.

7. In a multiple machine tool combination, a work loading device for serving two machines comprising a conveyor between said two machines for supplying unground workpieces and removing ground workpieces for both machines, a horizontal track long enough to serve said two machines, a carriage on said track, having a loading device and an unloading device, a motor for moving said carriage on said track, said motor having a range of movement to traverse said carriage between said conveyor and one machine, a rack corresponding in length to said track, means to traverse said carriage the full length of said track comprising means to disconnect said motor and said rack after said motor has reached the end of its range in one direction from one machine to said conveyor, and means to reverse said motor while it is disconnected from said rack preparatory to continuing the movement of said carriage in the same direction from said conveyor to the other machine.

8. In a multiple machine tool combination, a work loading device for serving two machines comprising a conveyor between said two machines for supplying unground workpieces and removing ground workpieces for both machines, a horizontal track long enough to serve said two machines, a carriage on said track, having a loading device and an unloading device, a motor for moving said carriage on said track, said motor having a range of movement to traverse said carriage between said conveyor and one machine, a rack corresponding in length to said track, means to traverse said carriage the full length of said track comprising means to disconnect said motor and said rack after said motor has reached the end of its range in one direction from one machine to said conveyor, means to reverse said motor while it is disconnected from said rack preparatory to continuing the movement of said carriage in the same direction from said conveyor to the other machine, and means for reconnecting said motor and said rack.

9. In a multiple machine tool combination, a work loading device for serving two machines comprising a conveyor between said two machines for supplying unground workpieces and removing ground workpieces for both machines, a horizontal track long enough to serve said two machines, a carriage on said track, having a loading device and an unloading device, a motor for moving said carriage on said track, said motor having a range of movement to traverse said carriage between said conveyor and one machine, a rack corresponding in length to said track, means to traverse said carriage the full length of said track comprising means to disconnect said motor and said rack after said motor has reached the end of its range in one direction from one machine to said conveyor, means to reverse said motor while it is disconnected from said rack preparatory to continuing the movement of said carriage in the same direction from said conveyor to the other machine, means for reconnecting said motor and said rack, and means to prevent reconnecting said motor and said rack until said reverse movement of said motor is completed.

10. In a multiple machine tool combination, a work loading device for serving two machines comprising a conveyor between said two machines for supplying unground workpieces and removing ground workpieces for both machines, a horizontal track long enough to serve said two machines, a carriage on said track, having a loading device and an unloading device, a motor for moving said carriage on said track, said motor having a range of movement to traverse said carriage between said conveyor and one machine, a rack corresponding in length to said track, means to traverse said carriage the full length of said track comprising means to disconnect said motor and said rack after said motor has reached the end of its range in one direction from one machine to said conveyor, means to reverse said motor while it is disconnected from said rack preparatory to continuing the movement of said carriage in the same direction from said conveyor to the other machine, means for reconnecting said motor and said rack, and means to prevent reconnecting said motor and said rack until said reverse movement of said motor is completed comprising a plunger movable into the path of said rack, spring means for actuating said plunger in one direction and power means for actuating said plunger in the opposite direction.

References Cited by the Examiner

UNITED STATES PATENTS

| 707,525 | 8/02 | Seaver | 212—128 X |
|---|---|---|---|
| 2,704,955 | 3/55 | Kendall et al. | |
| 2,780,895 | 2/57 | Silven et al. | |
| 2,813,380 | 11/57 | Narel et al. | |
| 2,827,178 | 3/58 | Pagdin | 212—128 |
| 2,867,058 | 1/59 | Balsiger | 51—215.3 X |
| 3,113,404 | 12/63 | Narel et al. | 51—215.3 X |

HUGO O. SCHULZ, *Primary Examiner.*